United States Patent
Hiyokawa et al.

(10) Patent No.: US 6,345,230 B1
(45) Date of Patent: *Feb. 5, 2002

(54) VEHICLE NAVIGATION SYSTEM AND METHOD

(75) Inventors: Toyoji Hiyokawa; Junzo Matsuba; Naokazu Ozaki, all of Anjo (JP)

(73) Assignee: Aisin AW Co., Ltd., Anjo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,429

(22) Filed: Apr. 20, 1999

(30) Foreign Application Priority Data

Apr. 20, 1998 (JP) .......................... 10-109915

(51) Int. Cl.$^7$ .............................................. G09B 29/00
(52) U.S. Cl. ........................ 701/209; 701/212; 340/990; 340/995
(58) Field of Search ................................ 701/209, 208, 701/210, 211, 212; 340/990, 995

(56) References Cited

U.S. PATENT DOCUMENTS

| | | | | |
|---|---|---|---|---|
| 5,629,854 A | * | 5/1997 | Schulte ........................ 701/207 |
| 5,729,109 A | * | 3/1998 | Kaneko et al. ............. 318/587 |
| 5,893,045 A | * | 4/1999 | Kusama et al. ............. 701/211 |
| 5,938,718 A | * | 8/1999 | Morimoto et al. .......... 701/201 |
| 5,983,158 A | * | 11/1999 | Suzuki et al. ............... 701/209 |
| 6,076,041 A | * | 6/2000 | Watanabe .................... 701/211 |

* cited by examiner

*Primary Examiner*—Tan Nguyen
(74) *Attorney, Agent, or Firm*—Oliff & Berridge, PLC

(57) ABSTRACT

A vehicle navigation system is presented for performing guidance along route which produces an intersection image upon controlling a drawing area of the intersection image on the basis of information and route regarding the intersection existing on the route which requires guidance. The navigation system display control unit determines the drawing area of the intersection image on the basis of map information stored in a memory, route information stored in a route memory and information concerning an intersection requiring route information and guidance prior to producing the intersection image. In addition, the display control unit judges whether the intersection which requires route guidance is larger than the predetermined limited scale rate, and if the intersection which requires guidance is larger than the predetermined image limit, the display control unit controls a display area by reducing the scale rate so as to be able to display the entire intersection or otherwise controls the display area so as to be able to display all routes within its intersection.

11 Claims, 8 Drawing Sheets

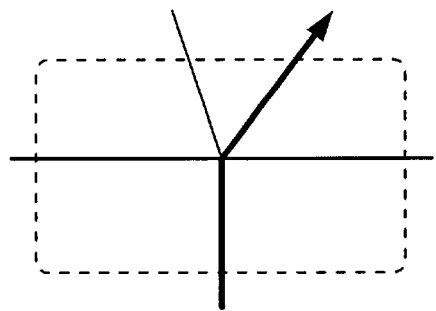
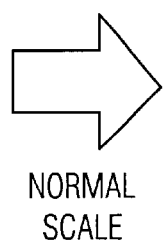
NORMAL SCALE
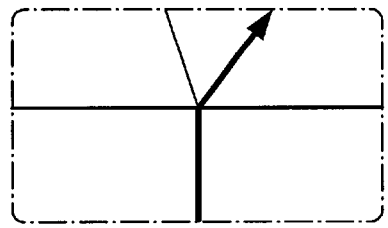
FIG. 8(A)  FIG. 8(B)
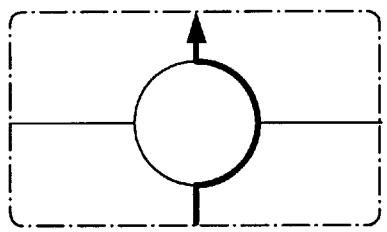
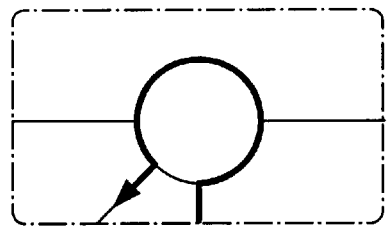
FIG. 8(C)  FIG. 8(D)
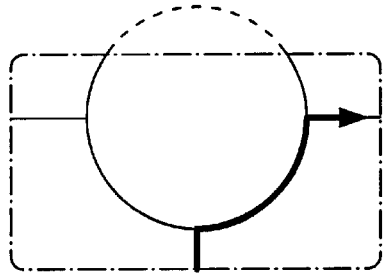
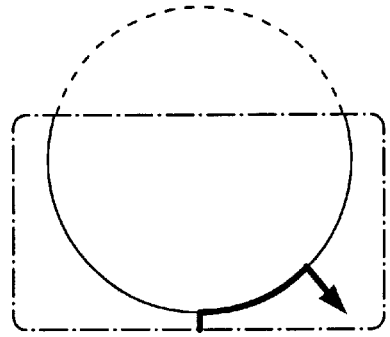
FIG. 8(E)  FIG. 8(F)
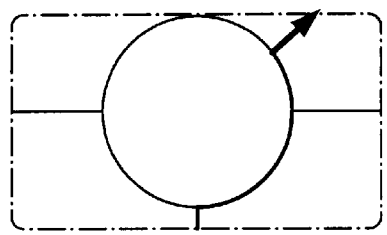
FIG. 8(G)

VEHICLE NAVIGATION SYSTEM AND METHOD

The entire disclosure of Japanese Patent Application No. 10-109915 filed on Apr. 20, 1998 including specification, claims, drawings and summary are incorporated herein by reference in its entirety.

BACKGROUND OF THE INVENTION

1. Field of the Invention

This invention relates to a navigation system which performs guidance along a route.

2. Description of the Prior Art

A vehicle navigation system performs setting a point such as a destination, a crossing point, a start point and etc., then performs route search from the present position or the start point to the destination or the crossing point, and performs guidance along the searched route. The route guidance system displays guide intersections such as an intersections etc. at which the vehicle should turn, then identifies and displays a road at which the vehicle exits out of the guide intersection. When performing route guidance at a distance to a peculiar object or a guide intersection in the middle of journey by displaying a map and etc., and the system often displays peculiar information regarding the guide intersection by switching from the map of the guide intersection to an enlarged intersection image when approaching the guide intersection. Thus, the guide intersection and the road exiting out of the intersection can be displayed easily by enlarging the intersection image thereof.

However, some of the previously proposed systems have an enlarged scale set at uniform rate prior to drawing the vicinity of the intersection as an enlarged intersection map by enlarging from a normal guide map on the basis of map data read out of the memory and, therefore, quite frequently cause an inconvenience. For example, if it is determined that an enlarged scale rate for drawing the intersection is increased in order to increase visibility as much as possible at a normal intersection, when drawing a large rotary as the enlarged intersection image, a road entering into the intersection and a road exiting out of the intersection results in being placed off the screen which disables those routes to be identified. On the contrary, when drawing all intersections including a large rotary etc. in order to accommodate them within a drawing limit, the enlarged scale rate has to be quite smaller. However, if the enlarged scale rate is to be a little too small on the basis of an intersection such as a large rotary, when drawing an enlarged intersection image, of a normal intersection such as a crossroads and a junction of three roads, unnecessary surrounding roads are also displayed due to the fact that the drawing limit area becomes wider. As a result, the unnecessary road impairs visibility of the desired intersection.

SUMMARY OF THE INVENTION

The invention provides a way to increase visibility of the guide intersection by drawing not only a normal intersection, but also a large rotary and etc. on the basis of an appropriate enlarged scale rate for each situation.

In order to attain this visibility, a navigation device is described that performs guidance along a route by making an intersection image by controlling a drawing area surrounding the intersection on the basis of information and a route regarding the intersection existing on said route which requires guidance.

Further, the invention comprises a map information memory for storing map information including information of a road and an intersection, a route search unit for calculating a route based on map information of map information memory, a route memory for storing route information calculated by the route search unit, a display control unit for making an intersection image regarding an intersection requiring guidance on the basis of the map information stored in the map information memory means and the route information stored in the route memory. The display control unit makes the intersection image upon determining an area of drawing the intersection image on the basis of information of the intersection which requires the route information and the guidance. Further, the display control unit judges whether the intersection which requires the guidance is larger than a predetermined image limit, if the intersection which requires guidance is larger than the predetermined image limit, the display control unit controls a display area with a reduction of the scale rate so as to display the entire intersection. Otherwise, the display control unit controls the display area so as to display all of the routes within the intersection.

These and other objects, features and advantages of the invention will be apparent from the following more particular description of preferred embodiments of the invention, as illustrated in the accompanying drawings.

BRIEF DESCRIPTION OF THE DRAWINGS

FIGS. 8(A)–8(G) are diagrams showing examples of drawing of a normal intersection and a large intersection.

DETAILED DESCRIPTION OF THE PREFERRED EMBODIMENTS

One embodiment of the invention will be described below with reference to the drawings.

Figure 1:
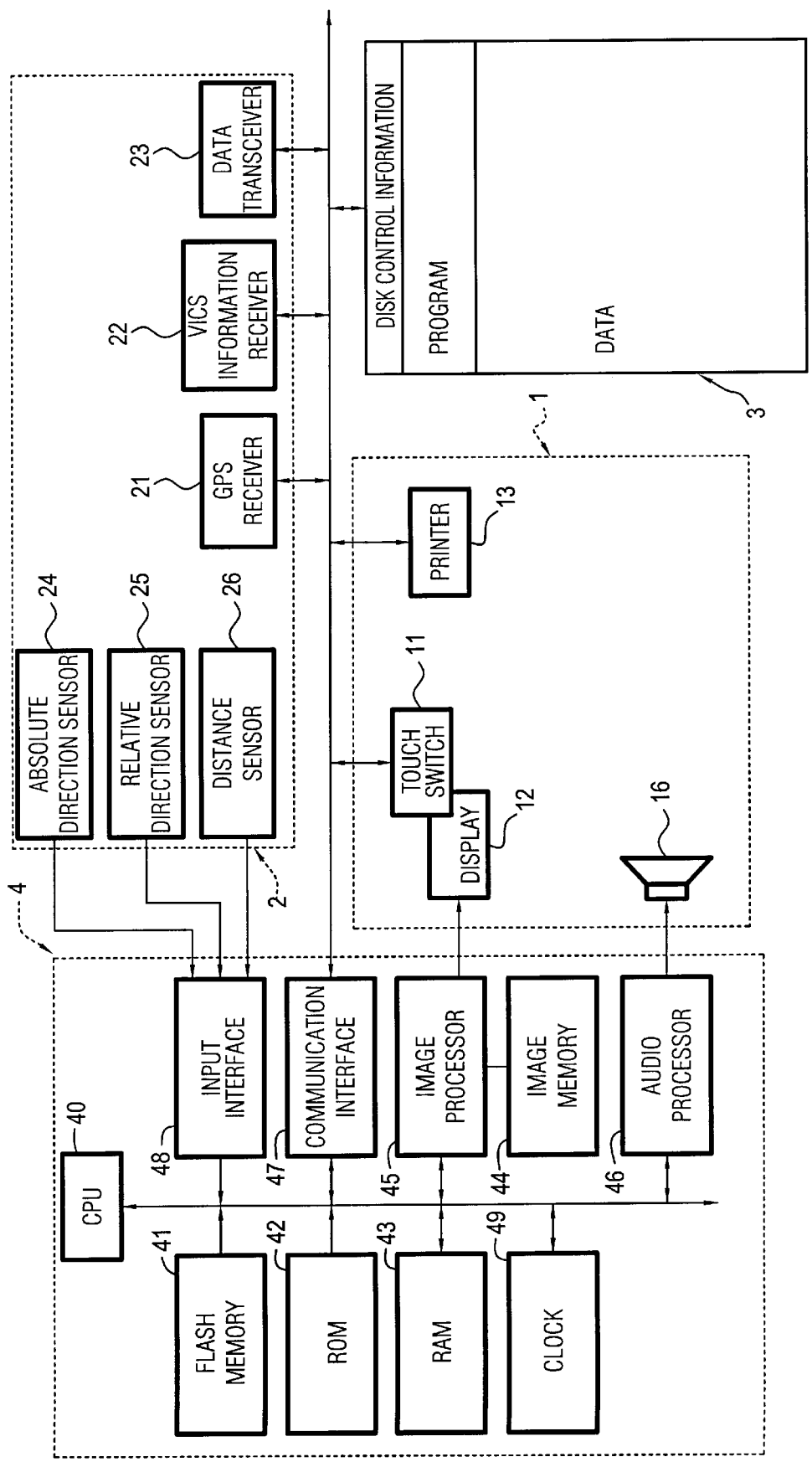
FIG. 1 is a block diagram showing a navigation system according to one embodiment of the present invention.

FIG. 1 is a block diagram showing one embodiment of vehicle navigation. A navigation system according to the invention, includes an input/output unit 1 for inputting/outputting information relating to route guidance as shown in FIG. 1; a present position detecting device 2 for detecting information on the present position of a vehicle; an information memory device 3 in which navigation data necessary for calculating a route and display/voice guidance data necessary for the route guidance and programs (application and/or OS) etc. are stored; and a central processing unit 4 for controlling the entire system with executing display guidance processing necessary for route search processing and route guidance.

The input/output unit 1 is equipped with functions to input a destination and to instruct the central processing unit 4 to execute the navigation processing at driver's own will, so as to be capable of outputting guidance data with voice and/or on a screen when required by the driver, and to print out the processed data etc. To implement these functions, the input section of the input/output unit 1 has a touch switch 11 for entering a destination in the form of a telephone number or coordinates on a map etc., and for requesting route guidance. It is also possible to use an input device such as a remote control etc. Further, the input section comprises a display 12 for displaying the input data and route guidance on screen, a printer 13 for printing out data processed by the central processing unit 4 and data stored in the information memory device 3, and a speaker 16 for audibly outputting route guidance.

At this stage, it is possible to add a voice recognition unit for enabling voice input or a record card reader for reading data recorded on an IC card or a magnetic card. It is also possible to add a data communication device for exchanging data between information sources such as an information center accumulating data necessary for navigation and providing information through communication lines as per the driver's request, and a notebook type electric unit in which map data and destination data have previously been stored.

The display 12 includes a color CRT or liquid-crystal display device. The display 12 outputs as a color display all screens necessary for navigation, such as a route setting screen, a screen of interval view and a screen for intersections etc. which are based on the map data and guidance data processed by the central processing unit 4, and also displays buttons for setting route guidance on screen, executing guidance during the route instruction and changing over screens. In particular, transit-intersection information, such as the names of the transit-intersections etc. is displayed in color in the forms of a pop-up menu on the interval view screen whenever necessary.

This display 12 is provided inside of the instrumental panel in the vicinity of the driver's seat. Observing the interval screen enables the driver to ascertain the present location of the vehicle and to obtain information on a route to follow. Further, the display 12 is provided with the touch switch 11 corresponding to the display of function buttons, and it is constructed that the above operations are executed based upon signals entered by touching said buttons. An input signals generating unit including the buttons and touch switch, comprises the input section, however, a detailed description thereof is omitted.

The present position detection device 2 detects or receives information on the present position of the vehicle, which is provided with an absolute directional sensor 24, such as a geomagnetic sensor, etc., a relative sensor 25 utilizing a steering sensor, a gyro sensor etc., a velocity sensor 26 for detecting travel distance from number of revolution of a wheel, GPS receiver utilizing a global positioning system (GPS), and a communication device. The communication device comprises a VICS (Vehicle Information & Communication System) information receiver 22 which is as traffic information receiver means and a data transceiver 23. VICS transmits traffic information to the vehicle in real time utilizing an FM multiplex signal (multiplexed text broadcasting), radio beacon or optical beacon for example. Further, the data transceiver 23, includes a cellular telephone or a personal computer, for example, which exchanges information required for navigation with the traffic information center (ATIS for example) when required by the driver.

The information memory device 3 may be an external storage device in which navigation program and data are stored, for example comprising CD-ROM. The external storage device may store in which a program for executing route search etc., a program for executing processing as shown in a flowchart of this embodiment, a program for executing a display output control necessary for route guidance, a program for executing a voice output control necessary for voice guidance, data necessary for those programs, and display data necessary for the route guidance and map display. The data comprises files of map data, search data, guidance data, map matching data, destination data, registered point data, road data, genre data, landmark data, and etc., (i.e., all data necessary for the navigation device). Here, the invention can be applied to a type of navigation in which the data are exclusively stored in CD-ROM whereas the programs are stored in the CPU.

A central processing unit 4 comprises a CPU 40 for performing various calculation processing: a flash memory 41 such as ROM can be rewritten to store important information (for example, a program to execute route search and route guidance, data to set a condition, data of various parameters and etc.) in nonvolatile manner (a nonvolatile memory which can be rewritten), namely, EEPROM for Electrically Erasable and Programmable ROM; a ROM 42 such as a nonvolatile memory wherein an executing program check of the flash memory 41, a program for executing update processing (a program reading device) and further a program for executing a data check of the flash memory 41 and a RAM 43 and for the control to be capable of mutually rewriting information stored in those flash memory 41 are stored; a RAM 43 such as a volatile memory with free-reading and free-writing wherein individually memorized information, such as a memory point to register information of given point by driver's operation, information of frequency accumulated by a learning function, and error modified information by various detective devices are temporarily (in a volatile manner) stored and the stored information can be maintained even if ACC is switched off, namely, SRAM: Static RAM which can electrically maintain the temporarily stored information; and a image memory 44 which stores image data used for screen display to a display 12. The central processing unit 4 further comprises a image processor 45 for extracting image data from the image memory 44 on the basis of a display-output control signal received form the CPU 40 and executing image processing prior to output the data to the display 12; an audio processor 46 in which an analog signal as converted by combining audio, phrases, single sentences and sounds etc. read out of the information memory device 3 on the basis of the display-output control signal, and the analog signal is output to a speaker 16; a communication interface 47 for performing an exchange of input/output data by communications; a sensor-input interface 48 for accepting a sensor signal received from the present position detecting device 2; and a clock 49 for entering a date and time into internal dialog information. The central processing unit 4, wherein accepting data obtained by each sensor of the present position detecting device 2 from the sensor-input interface 48, and CPU 40 calculates present position coordinates in every certain time on the basis of that data and temporarily writes into the RAM 43. These present position coordinates in which a map matching processing is executed upon considering detecting error of various data.

Further, output values derived from various sensors are always modified. Here, route guidance is constructed be capable of selecting both screen display and audio output.

Further, the program and data for navigation may be received externally through a data transceiver 23. Thus, reading externally the program and data necessary for navigation through the data transceiver 23, thereby the necessary programs or the latest data can be updated timely prior and then stored by applying memory mediums such as DVD etc. instead of CD-ROM to a information memory device 3, and further they can be stored directly in the flash memory 41 and the RAM 43 of the central processing unit 4 by omitting the information memory device 3.

Figure 2:
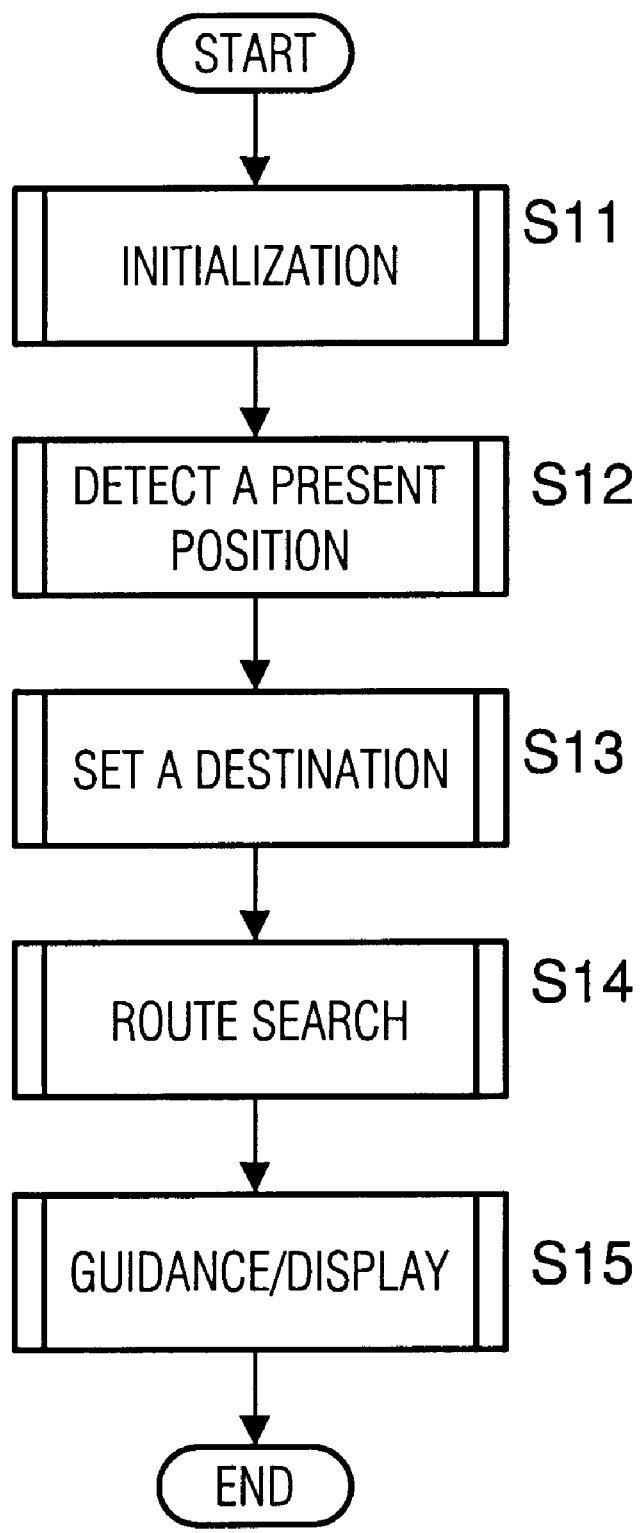
FIG. 2 is a flowchart of a routine showing the entire system of the navigation according to the present invention.

Next, the operation will be described. FIG. 2 is a flowchart of a routine showing the entire system of the navigation according to the invention.

FIG. 2 is a flowchart describing the process of the overall navigation to begin with starting the system up as a navigation device, entering a point, executing a route search to complete processing to execute route guidance etc. by a CPU 40 of a central processing device 4, which first of all, shows reading out a navigation program from CD-ROM after initialization processing, then the read program is stored in a flash memory 41 prior to activation (step S11). Then, the navigation device detects a present position by using a present position detection device 2, and displays a present position around map as the present position and its name are centered (step S12). Next, the navigation device sets a destination by using telephone number, address, facility name and registered location, etc. (step S13), and executes a route search from the present position to the destination (step S14). When the route is determined, the navigation system performs display and audio output processing of route guidance until the vehicle reaches the destination as keeping track of the present position using the present position detecting device 2 (step S15).

Figure 3:
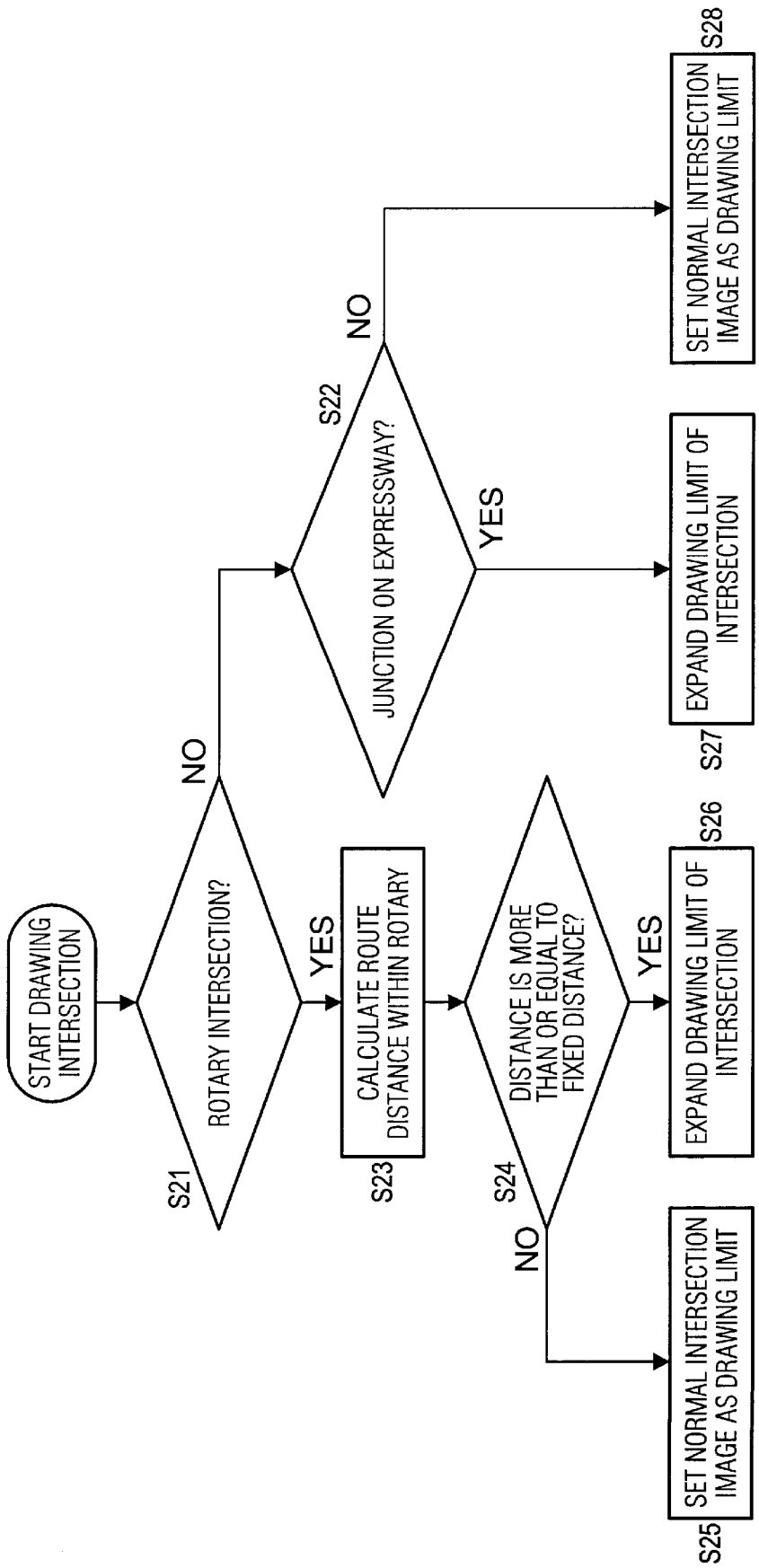
FIG. 3 is a flowchart describing an example of processing to draw upon determining a scale so as to be capable of drawing all guide routes of a guide intersection.

The invention according to the navigation device, draws an enlarged intersection image for route guidance. A route from a road entering into an intersection to a road exiting out of the intersection is to be drawn in the enlarged intersection image with an appropriate scale rate by changing the scale rate according to a size of the intersection. Therefore, when a rotary or a junction on an expressway are identified when drawing the enlarged intersection image, the scale rate is reduced according to its size so as to expand the image limit of the intersection. Examples of concrete processing are explained as follows. FIG. 3 is a flowchart describing an example of processing for drawing upon determining a scale so as to be capable of drawing all guide routes of a guide intersection, and FIG. 4 is a diagram showing an example of drawing of a rotary and a guide route.

The drawing process for drawing all guide routes of guide intersection by determining a scale, is shown in FIG. 3.

First of all, the process judges whether a guide intersection to be drawn is a rotary intersection (step S21). If the guide intersection is not the rotary intersection, then the process further judges whether the guide intersection to be drawn is a junction on an expressway (step S22). If the guide intersection is a junction on the expressway, a drawing limit of an enlarged intersection image is expanded on the basis of a size of the junction (step S27). On the other hand, if the guide intersection is not a junction on the expressway, it is considered as a normal intersection and the drawing limit for a normal enlarged intersection image is to be applied accordingly (step S28).

Figure 4:
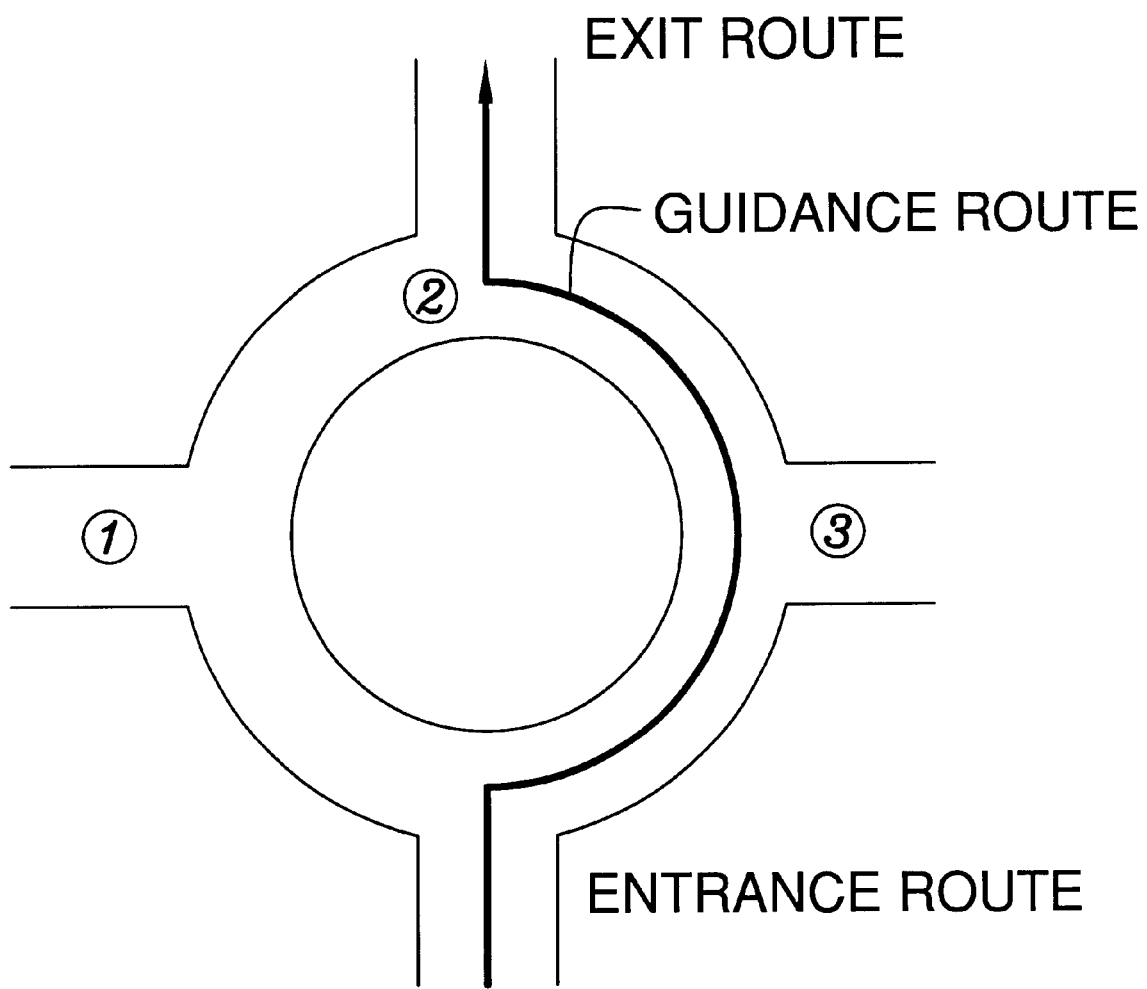
FIG. 4 is a diagram showing an example of drawing of a rotary and a guide route.

However, if the intersection is judged as a rotary intersection at step 21, the route distance is calculated from an entrance road to an exit road within the rotary along the guide route shown as a bold line of FIG. 4 (step S23), and a further judging of whether the calculated distance is more than or equal to a fixed value occurs (step S24). When the route distance within the rotary is not more than or equal to the fixed value, the said guide intersection is judged as same as the normal intersection and the normal enlarged intersection image is applied as the drawing limit (step S25). On the other hand, when the route distance within the rotary is more than or equal to the fixed value, the drawing limit of the enlarged intersection image is to be expanded on the basis of its route distance (step S26). Thus, the enlarged intersection image of a large rotary etc., in which an enlarged scale rate is used, is calculated on the basis of the distance from the entrance road to the exit road of its rotary.

In this case, the distance from the entrance road to the exit road of its rotary is reached more than or equal to a halfway point of the rotary as calculated on the basis of a radius of its rotary, and the scale rate is to be the most reduced one to be capable of accommodating the entire rotary within the drawing limit. For example, as shown in FIG. 4, a route in which a vehicle travels passing through the rotary to a straight direction is taken. However, if a route in which the vehicle exits out of the rotary to a road 3 following a right direction is taken, it is enough as long as all routes including a road entering from a lower direction to the rotary and a road exiting out of the rotary to the right direction can be accommodated in the drawing limit, so that the enlarged scale rate is increased. On the other hand, if a route in which the exit road out of the rotary requires traveling ¾ around the top end of the rotary as to reach a road 1 following to a left direction is taken, all the routes cannot be accommodated unless the top end of the rotary is included in the drawing limit, which as a result, the enlarged scale rate is reduced.

Figure 5:
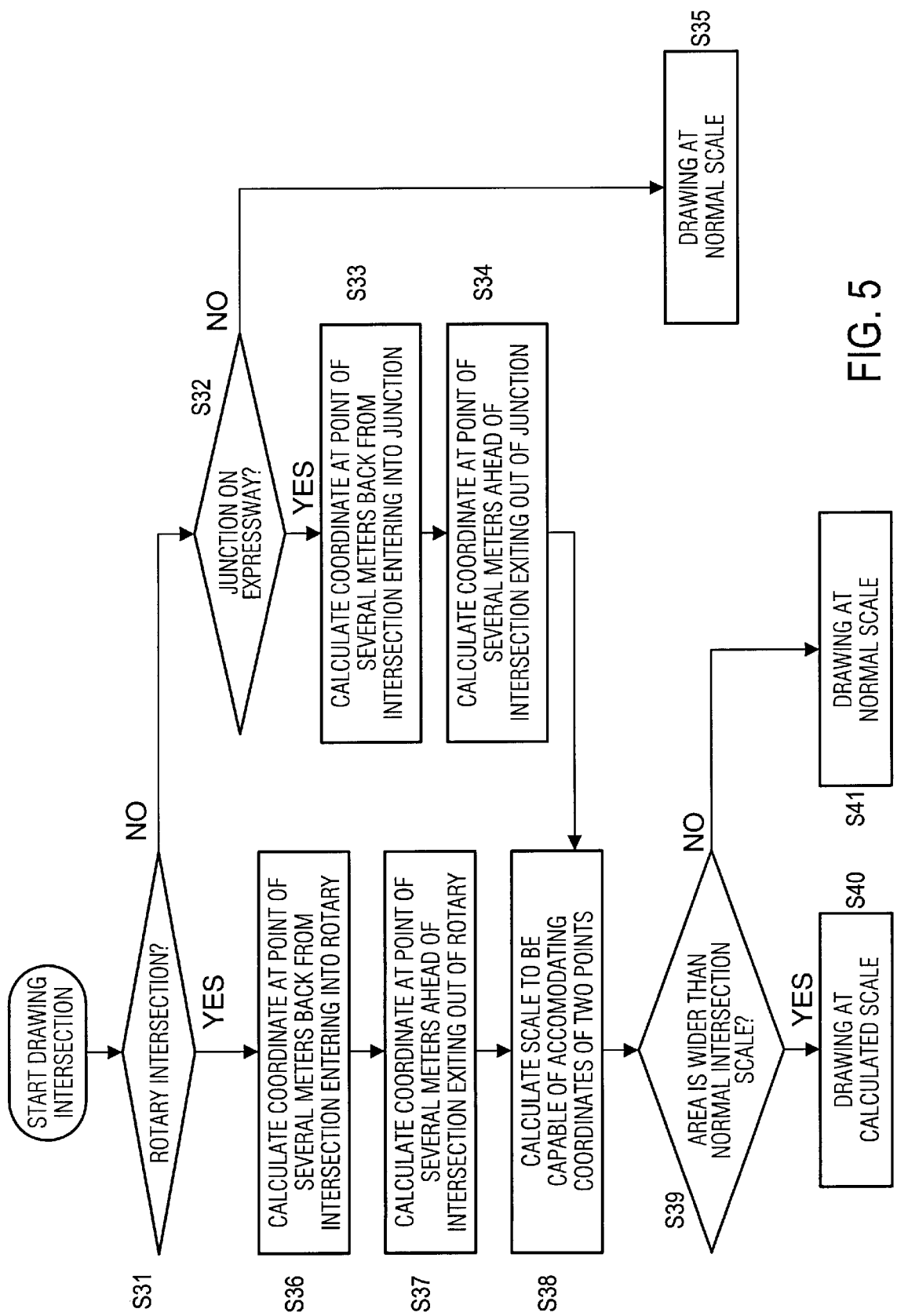
FIG. 5 is a flowchart describing an example of processing to draw upon determining a scale on the basis of coordinates at an entrance of the intersection and an exit of the intersection.
Figure 6:
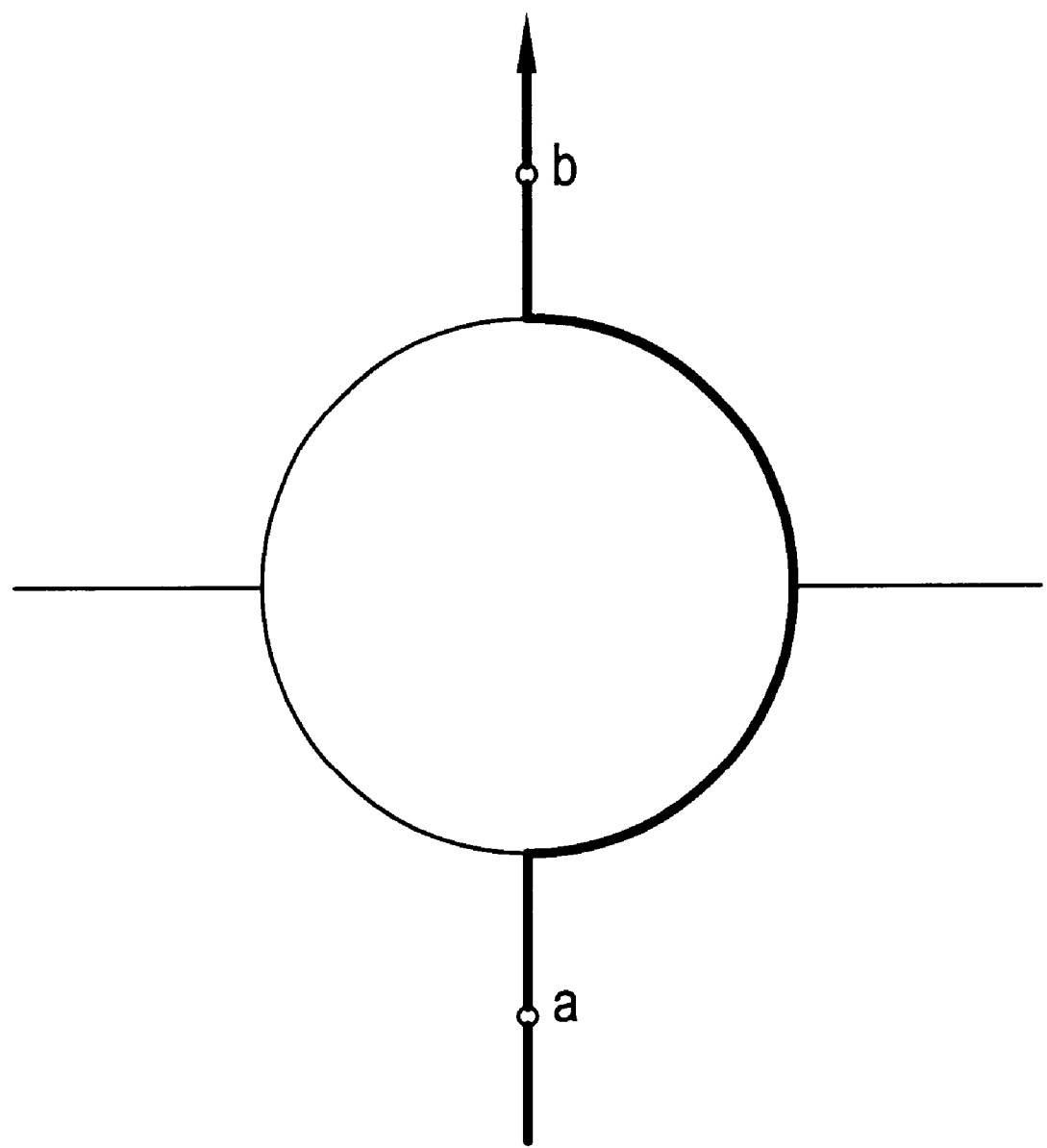
FIG. 6 is a diagram showing an example of coordinates used for determining a rotary and a scale.

As described above, the size of the rotary may be judged on the basis of the distance of the rotary from the entrance road to the exit road within the rotary which is set as a standard. The size of the intersection may also be judged on the basis of the coordinates, and the junction on the expressway may be drawn as the large intersection. FIG. 5 is a flowchart describing an example of processing to draw upon determining a scale on the basis of coordinates at an entrance of the intersection and an exit of the intersection, and FIG. 6 is a diagram showing an example of coordinates used for determining a rotary and a scale.

The processing to draw upon determining the scale on the basis of the coordinates at the entrance of the intersection and the exit of the intersection, is shown in FIG. 5. First, the process judges whether the guide intersection to be drawn is a rotary intersection (step S31). If it is not a rotary intersection, the process further judges whether the guide intersection is the junction on the expressway (step S32). If judged as not being a junction on the expressway, then the process judges it as a normal intersection, in which drawing is performed at the normal scale (step S35). If judged as a junction, then the process calculates a coordinate at a point of several meters back from the intersection entering into the junction (step S33) as well as a coordinate at a point of several meters ahead of the intersection existing out of the junction (step S34). However, in case that the intersection is judged as a rotary intersection at step 31, a coordinate at point (a) several meters back from the intersection entering into the rotary (step S36) as well as a coordinate at point (b) several meters ahead of the intersection existing out of the rotary (step 37) are calculated.

Next, as calculating a scale capable of accommodating two coordinates (a) and (b) which are calculated at steps S33, S34 and steps S36, S37 (step S38), the process judges whether the calculated scale shows a wider area than the scale intersection (step S39). If wider than the normal scale intersection, the intersection is drawn at the calculated scale (step S40), and if not wider than the normal scale intersection, it is then judged as a normal intersection and is drawn at the normal scale (step 41).

In this processing, though, if the route in which the exit road out of the rotary requires over the halfway point of the rotary traveling through the top end of the rotary to reach a road following to the left direction as traveled ¾ of the rotary, all the routes cannot be accommodated within the drawing limit unless the top end of the rotary is included. This is the same as the processing shown in FIG. 3 based on a relationship between the entrance road and the exit road, therefore, the enlarged scale rate is reduced. At this stage, however, whether the route requires more than or equal to traveling half way around the rotary, the process can be judged depending upon whether the coordinate of the exit road is to be located on the left side of the coordinate of the entrance road, and further depending upon a comparison between a length of the rotary and a length of the route (from the entrance to the exit of the rotary).

Figure 7:
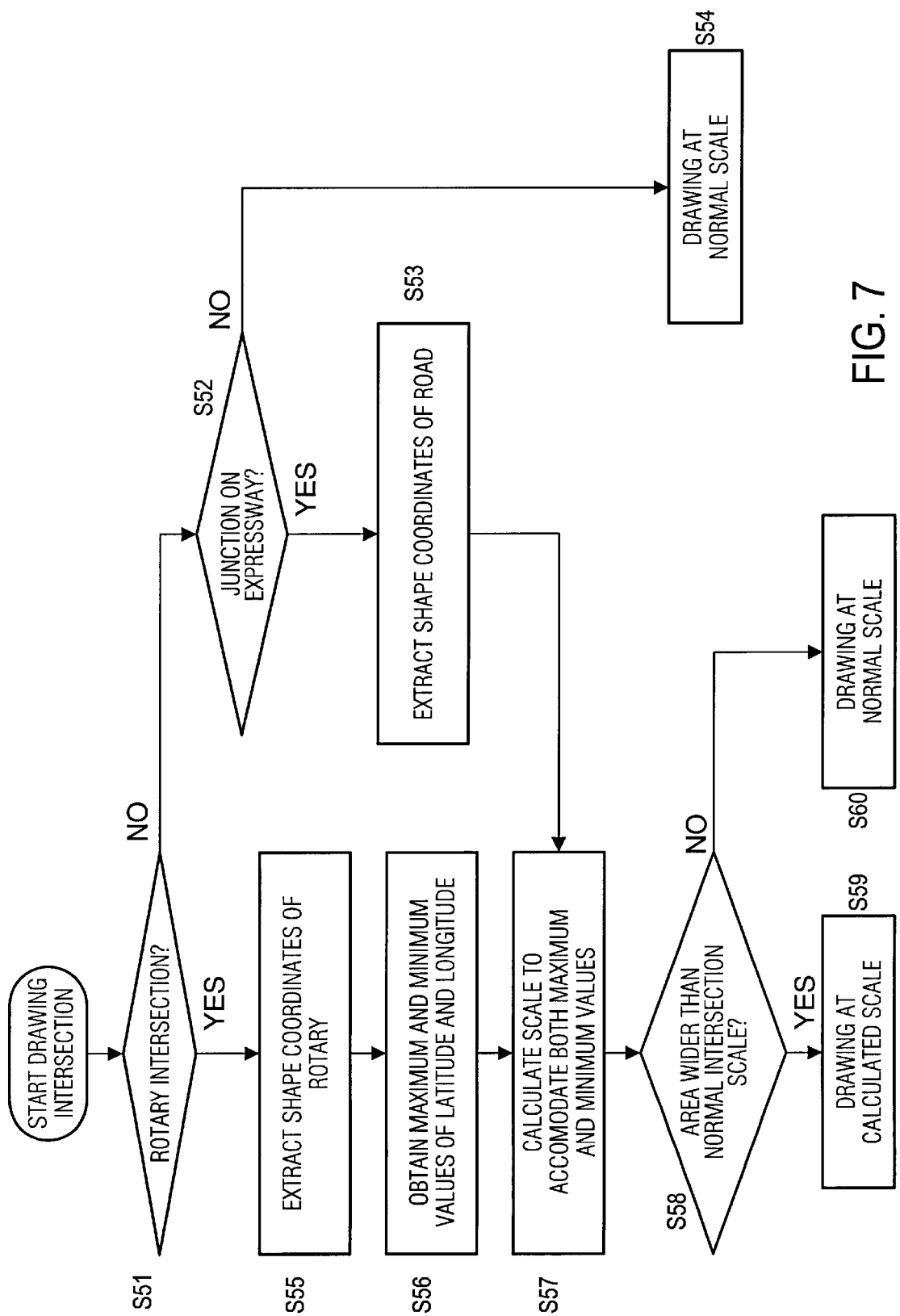
FIG. 7 is a flowchart describing an example of processing to draw upon determining a scale on the basis of shape coordinates of the guide intersection.

The example described as above, wherein judging the size of the intersection on the basis of the coordinates of two points, additionally, judging the size of the intersection on the basis of the shape coordinates of the intersection may also be allowed. FIG. 7 is a flowchart describing an example of processing to draw upon determining a scale on the basis of shape coordinates of the guide intersection, and FIGS. 8(A)–8(F) are diagrams showing examples of drawing of a normal intersection and a large intersection.

The processing to draw upon determining the scale on the basis of the shape coordinates of the guide intersection, is shown in FIG. 7. First, the process determines whether the guide intersection to be drawn is a rotary intersection (step S51). If not a rotary intersection, then the process further judges whether it is a junction on the expressway (step S52). If not the junction on the expressway, it is judged as a normal intersection and at last, drawing is performed at the normal scale (step S54). If judged as the junction, the shape coordinates of roads at the junction (step S53) are extracted. However, if judged as the rotary intersection at step S51, the shape coordinates of the rotary are to be extracted (step S55), and both the minimum and maximum values of the east latitude and the north longitude are to be obtained (step S56).

Next, the scale capable of accommodating both the minimum and maximum values of the east latitude and the north longitude of the shape coordinates extracted is calculated at steps S53 and S55 (step S57). The process then judges whether the calculated scale shows a wider area than the normal intersection scale (step S58), and if judged as the wider area than the normal intersection scale, then drawing is performed at the calculated scale (step S59). On the other hand, if it is not judged as a wider area than the normal intersection scale, then it is judged as a normal intersection and at last, drawing is performed at the normal intersection scale (step S60).

In the guide intersection as described above according to the invention, the normal intersection such as crossroads and a junction of five roads is shown in FIG. 8(A). The guidance information along the entrance road and the exit road can be displayed as long as the fixed limit centering its intersection is drawn as the enlarged intersection image. Therefore, the enlarged intersection image as shown in FIG. 8(B) is drawn by applying the normal enlarged scale rate, namely the dotted line area is applied as the drawing limit.

As described above, an intersection is positioned on the center of the screen for the normal intersection. On the other hand, in case of the rotary intersection, if the same enlarged scale rate as the normal intersection is applied, the entire rotary extends off screen as a center of the rotary is positioned on the center of screen, therefore, neither the entrance road and the exit road nor the guidance information along the route can be displayed. However, in the present invention, the enlarged scale rate is reduced (the scale rate is reduced) further than the normal intersection. Therefore, necessary information in proximity to the intersection including the entrance road, the exit road and the route can be displayed as shown in FIG. 8(C).

Further, the rotary intersection and other intersections having complicated shapes in which unnecessary information is increased if trying to display the entire intersection on the basis of the exit road, results in impairing visibility. The present invention is made to solve such problem. For example, the scale is obtained on the basis of the route distance as described in FIG. 3, the coordinates of the predetermined point on the basis the road entering into the intersection and the road exiting out of the intersection as described in FIG. 5, and the shape coordinates of the intersection as described in FIG. 7. Therefore, drawing can be performed as preventing the route including the entrance road and the exit road from extending off the intersection image, so that the intersection image can be drawn at the optimal scale and limit on the basis of the route as shown in FIGS. 8(D)–(G).

For example, as shown in FIG. 8(E) is a drawing example of the route having a road exiting out to the right direction, FIG. 8(F) shows a drawing example of the route having a road exiting out to the lower right direction, FIG. 8(G) shows a drawing example of the route having a road exiting out to the upper right direction, and FIG. 8(D) shows a drawing example of the route having a road exiting out to the lower left direction, thus the enlarged scale rate is respectively different. However, if having the route exiting out to the left side by traveling more than or equal to halfway around the rotary, the enlarged scale rate is the same as the examples shown in FIGS. 8(C) and (D) because the drawing limit is made to be capable of accommodating up to the top end of the rotary.

However, the present invention is not limited to the above mentioned embodiments, and various changes can be applied. For example, in the above embodiment, the rotary intersection and the junction on the expressway are extracted, thereby judging whether each is a large intersection. However, if the guide intersections are continuously existing in the route, the same processing may also be performed under the condition that the distances are all within the fixed value by calculating distances between those intersections. In this case, for example, the processing is to be performed so as to reduce the enlarged scale rate by setting an area including two intersections from its entrance road to its exit road as one large intersection under the condition that the distances between intersections are within the fixed value. Basically, only a route from the entrance road into the intersection to the exit road out of the intersection is required to be drawn at an optimal enlarged scale rate. Therefore, not only the processing explained in FIGS. 3, 5, 7, but also information regarding shape of the intersection and information regarding the road entering into the intersection and the road exiting out of the intersection, may be applied to obtain the enlarged scale rate. Other processing may also be applied, such as selecting an optimal scale from a combination of the processes determining the drawing limit.

As being clear from the above explanation, in the system according to the invention, the drawing device draws the enlarged intersection image by reducing the enlarged scale rate more than its normal intersection by judging whether the intersection to be drawn is larger than the normal intersection, when the drawing device displays an intersection image on the display by reading out map data stored in the memory. Therefore, this can prevent the road entering into the intersection as well as the road exiting out of the intersection from extending off the enlarged intersection image and from being out of display when drawing the large intersections, such as a rotary intersection, an expressway junction, etc. Further, the drawing device can prevent the drawn enlarged intersection from being displayed off screen. In addition, the drawing device can display a route entering into the intersection and a route exiting out of the intersection if the guide intersections are extremely close together and continuously approaching, thus a driver is assured that he can drive through the intersection smoothly without being perplexed.

What is claimed is:

1. A vehicle navigation system, comprising:
    a map information memory that stores map information including information regarding roads, rotary intersections or junctions;
    a route search unit that calculates a route on the basis of the map information of the memory;
    a route memory that stores route information calculated by the route search unit; and
    a display control unit that produces an intersection image that displays the rotary intersection or the junction requiring guidance on the basis of the map information and the route information, wherein the display control unit calculates coordinates at an entrance and an exit of the rotary or the junction and calculates a scale capable of accommodating two calculated coordinates and produces the intersection image at the calculated scale.

2. A vehicle navigation system according to claim 1, wherein the display control unit judges whether the calculated scale is wider than the normal scale and produces the intersection image at the calculated scale if the calculated scale is wider than the normal scale.

3. A vehicle navigation system, comprising:
    means for storing map information including information regarding roads, rotary intersections or junctions;
    means for calculating a route on the basis of the map information;
    means for storing calculated route information; and
    means for producing an intersection image that displays the rotary intersection or the junction requiring guidance on the basis of the map information and the route information by calculating coordinates at an entrance and an exit of the rotary or the junction and calculating a scale capable of accommodating two calculated coordinates, wherein the intersection image at the calculated scale is produced.

4. A vehicle navigation system, comprising:
    a program for storing map information including information regarding roads, rotary intersections or junctions in a map information memory;
    a program for calculating a route on the basis of map information in a route search unit;
    a program for storing the calculated route information in a route memory;
    a program for producing an intersection image that displays the rotary intersection or the junction requiring guidance on the basis of the map information and the route information; and
    a program for calculating coordinates at an entrance and an exit of the rotary or the junction and calculating a scale capable of accommodating two calculated coordinates and producing the intersection image at the calculated scale.

5. A vehicle navigation system, comprising:
    a map information memory that stores map information including information regarding roads and rotary intersections;
    a route search unit that calculates a route on the basis of the map information of the memory;
    a route memory that stores route information calculated by the route search unit; and
    a display control unit that produces an intersection image that displays the rotary intersection requiring guidance on the basis of the map information and the route information, wherein the display control unit calculates a route distance from an entrance road to an exit road within the rotary, calculates a scale of the intersection image on the basis of the route distance and produces the intersection image at the calculated scale.

6. A vehicle navigation system, comprising:
    a map information memory that stores map information including information regarding roads, rotary intersections or junctions;
    a route search unit that calculates a route on the basis of the map information of the memory;
    a route memory that stores route information calculated by the route search unit; and
    a display control unit that produces an intersection image that displays the rotary intersection or the junction requiring guidance on the basis of the map information and the route information, wherein the display control unit calculates minimum and maximum values of shape coordinates at the rotary or the junction, calculates a scale capable of accommodating the calculated minimum and maximum values and produces the intersection image at the calculated scale.

7. A vehicle navigation system according to claim 6, wherein the display control unit judges whether the calculated scale is wider than the normal scale and produces the intersection image at the calculated scale if the calculated scale is wider than the normal scale.

8. A method for a vehicle navigation, comprising:
    storing map information including information regarding roads and rotary intersections;
    calculating a route on the basis of the stored map information;
    storing the calculated route information;
    calculating a route distance from an entrance road to an exit road within the rotary and calculating a scale of an intersection image on the basis of the route distance; and
    producing the intersection image at the calculated scale that displays the rotary intersection requiring guidance on the basis of the map information and the route information.

9. A vehicle navigation system, comprising:
    a program for storing map information including information regarding roads and rotary intersections in a map information memory;
    a program for calculating a route on the basis of map information in a route search unit;
    a program for storing the calculated route information in a route memory;

a program for producing an intersection image that displays the rotary intersection requiring guidance on the basis of the map information and the route information; and a program for calculating a route distance from an entrance road to an exit road within the rotary, calculating a scale of the intersection image on the basis of the route distance and producing the intersection image at the calculated scale.

10. A method for vehicle navigation, comprising:

storing map information including information regarding roads, rotary intersections or junctions;

calculating a route on the basis of the stored map information;

storing the calculated route information;

calculating minimum and maximum values of shape coordinates at a rotary or the junction and calculating a scale capable of accommodating the calculated minimum and maximum values; and producing an intersection image at the calculated scale that displays the rotary intersection or the junction requiring guidance on the basis of the map information and the route information.

11. A vehicle navigation system, comprising:

a program for storing map information including information regarding roads, rotary intersections or junctions in a map information memory;

a program for calculating a route on the basis of map information in a route search unit;

a program for storing the calculated route information in a route memory;

a program for producing an intersection image that displays the rotary intersection or the junction requiring guidance on the basis of the map information and the route information; and a program for calculating minimum and the maximum values of shape coordinates at the rotary or the junction, calculating a scale capable of accommodating and calculating the minimum and maximum values and producing the intersection image at the calculated scale.

* * * * *